(12) United States Patent
Zhu et al.

(10) Patent No.: US 12,061,148 B2
(45) Date of Patent: Aug. 13, 2024

(54) MULTIMODAL SIGNAL ACQUISITION DEVICE AND METHOD, AND LASER IMAGE SYSTEM

(71) Applicant: FEMTOSECOND RESEARCH CENTER CO., LTD., Guangzhou (CN)

(72) Inventors: Xin Zhu, Guangzhou (CN); Bingwei Xu, Guangzhou (CN); Hua Zhong, Guangzhou (CN)

(73) Assignee: FEMTOSECOND RESEARCH CENTER CO., LTD., Guangzhou (CN)

( * ) Notice: Subject to any disclaimer, the term of this patent is extended or adjusted under 35 U.S.C. 154(b) by 0 days.

(21) Appl. No.: 18/026,135

(22) PCT Filed: Sep. 8, 2021

(86) PCT No.: PCT/CN2021/117247
§ 371 (c)(1),
(2) Date: Mar. 14, 2023

(87) PCT Pub. No.: WO2022/057711
PCT Pub. Date: Mar. 24, 2022

(65) Prior Publication Data
US 2023/0288334 A1    Sep. 14, 2023

(30) Foreign Application Priority Data
Sep. 16, 2020 (CN) .......................... 202010977384.8

(51) Int. Cl.
*G01N 21/64* (2006.01)
(52) U.S. Cl.
CPC ..... *G01N 21/6402* (2013.01); *G01N 21/6456* (2013.01); *G01N 2201/06113* (2013.01)
(58) Field of Classification Search
CPC ........... G01N 21/6402; G01N 21/6456; G01N 2201/06113
See application file for complete search history.

(56) References Cited

U.S. PATENT DOCUMENTS

| 5,946,093 A * | 8/1999 | DeFreez | G01N 15/02 250/222.2 |
|---|---|---|---|
| 2011/0284639 A1 | 11/2011 | Lee et al. | |
| 2012/0276578 A1 | 11/2012 | Stringari et al. | |

(Continued)

FOREIGN PATENT DOCUMENTS

| CN | 101254091 A | 9/2008 |
|---|---|---|
| CN | 101504370 A | 8/2009 |

(Continued)

OTHER PUBLICATIONS

Translation of CN101650299A (Year: 2010).*
(Continued)

*Primary Examiner* — David P Porta
*Assistant Examiner* — Mamadou Faye
(74) *Attorney, Agent, or Firm* — Bayramoglu Law Offices LLC

(57) ABSTRACT

A multimodal signal acquisition device and method, and a laser image system are provided. The multimodal signal acquisition device is configured to acquire a multimodal signal generated by a laser pulse that irradiates a sample and includes an independent-channel acquisition module and a spectral signal processing device. The independent-channel acquisition module is provided with multiple independent spectral signal acquisition channels, each of which corresponds to a spectral signal of a specific spectral range in the multimodal signal. Each of the spectral signal acquisition channels acquires the multimodal signal, filters the corresponding spectral signal of the specific spectral range from the multimodal signal, and sends the spectral signal to the spectral signal processing device. The spectral signal processing device is configured to receive the spectral signal acquired by each of the spectral signal acquisition channels and perform imaging and superposed output of each spectral signal.

10 Claims, 3 Drawing Sheets

(56) References Cited

U.S. PATENT DOCUMENTS

| | | | |
|---|---|---|---|
| 2017/0039415 A1* | 2/2017 | Needleman | G06V 20/695 |
| 2017/0284940 A1* | 10/2017 | Butte | G01N 21/6408 |
| 2018/0196246 A1 | 7/2018 | Bares et al. | |
| 2019/0167116 A1 | 6/2019 | Chen et al. | |

FOREIGN PATENT DOCUMENTS

| | | | |
|---|---|---|---|
| CN | 101650299 A | * | 2/2010 |
| CN | 101650299 A | | 2/2010 |
| CN | 102621121 A | | 8/2012 |
| CN | 104614353 A | | 5/2015 |
| CN | 105877711 A | | 8/2016 |
| CN | 107462336 A | | 12/2017 |
| CN | 108885173 A | | 11/2018 |
| CN | 210055952 U | * | 2/2020 |
| CN | 112129702 A | | 12/2020 |
| JP | 2004341204 A | | 12/2004 |
| JP | 2016512345 A | | 4/2016 |
| JP | 2017504019 A | | 2/2017 |
| JP | 2020020791 A | | 2/2020 |
| JP | 2020514775 A | | 5/2020 |
| WO | WO-2016118557 A1 | * | 7/2016 |

OTHER PUBLICATIONS

Nannan et al. "Potential Indexing of the Invasiveness of Breast Cancer Cells by Mitochondrial Redox Rations", Springer International Publishing Switzerland, 2016, p. 121-127. (Year: 2016).*

Translation of CN-210055952-U (Year: 2020).*

Einstein et al. "Live cell metabolic imaging of cancer cell lines using multiphoton fluorescence polarization" Proc. of SPIE vol. 11244, Feb. 14, 2020, pp. 112441B-1-112441B-8 (Year: 2020).*

Vinod et al. Monitoring Changes in Endogenous Fluorophores through Quantitative FLIM Imaging in Live Cells, Proc. of SPIE vol. 8226, 2012, pp. 822644-1-822644-7 (Year: 2012).*

Einstein reference date (Year: 2020).*

Wenyan Hu, Label-free Nonlinear Optical Microscopic Imaging of Fresh Pancreatic Tissues, A Dissertation Submitted in Partial Fulfillment of the Requirements for the Degree of Doctor of Philosophy in Engineering, 2014, pp. 1-101.

Einstein Gnanatheepam, et al., Live cell metabolic imaging of cancer cell lines using multiphoton fluorescence polarization, Progress in Biomedical Optics and Imaging, SPIE, 2020, pp. 112418-1-112441B-8, vol. 11244.

Jonathan A. Palero, et al, Non-linear microscopy and spectroscopy of skin tissues, Proceedings of SPIE, 2005, pp. 59680H-1-59680H-9, vol. 5968.

Leann M. Tiede, et al., Determination of hair cell metabolic state in isolated cochlear preparations by two-photon microscopy, Journal of Biomedical Optics, 2007, pp. 021004-1-021004-8, vol. 12(2).

Shaohui Huang, et al., Two-Photon Fluorescence Spectroscopy and Microscopy of NAD(P)H and Flavoprotein, Biophysical Journal, 2002, pp. 2811-2825, vol. 82.

Andrew J. Radosevich, et al., Hyperspectral in vivo two-photon microscopy of intrinsic contrast, Optics Letters, 2008, pp. 2164-2166, vol. 33 No. 18.

* cited by examiner

MULTIMODAL SIGNAL ACQUISITION DEVICE AND METHOD, AND LASER IMAGE SYSTEM

CROSS REFERENCE TO THE RELATED APPLICATIONS

This application is the national phase entry of International Application No. PCT/CN2021/117247, filed on Sep. 8, 2021, which is based upon and claims priority to Chinese Patent Application No. 202010977384.8, filed on Sep. 16, 2020, the entire contents of which are incorporated herein by reference.

TECHNICAL FIELD

The present application relates to the technical field of laser and in particular to a multimodal signal acquisition device and method, and a laser image system.

BACKGROUND

Laser sources with special spectra are used in nonlinear laser microscopy. For example, in the Chinese patent application 201710916860.3, a femtosecond laser pulse is used as the laser source. The femtosecond laser pulse is transmitted through an optical component to irradiate a sample and interacts with the sample to generate a multimodal signal. The multimodal signal is acquired by a signal acquisition device to obtain multiple nonlinear molecular image modes.

In a common technical solution, the multimodal signal includes spectral signals of different spectral ranges, including a harmonic signal of the laser pulse and a fluorescence signal. When the signal acquisition device acquires these spectral signals, the spectral information of different spectral ranges overlaps and is hard to separate. If each mode is acquired sequentially, a calibration deviation will often be introduced, which will affect the imaging effect.

SUMMARY

To solve most, if not all, of the above technical defects, in particular, that a calibration deviation is introduced and the imaging effect is affected, an objective of the present application is to provide a multimodal signal acquisition device and method, and a laser image system.

The multimodal signal acquisition device is configured to acquire a multimodal signal generated by a laser pulse that irradiates a sample and includes an independent-channel acquisition module and a spectral signal processing device that are connected to each other, where
the independent-channel acquisition module is provided with multiple independent spectral signal acquisition channels, each of which corresponds to a spectral signal of a specific spectral range in the multimodal signal.

After the laser pulse of a specific spectral range irradiates the sample to generate the multimodal signal, each of the spectral signal acquisition channels acquires the multimodal signal, filters the corresponding spectral signal of the specific spectral range from the multimodal signal, and sends the spectral signal to the spectral signal processing device.

The spectral signal processing device is configured to receive spectral signals acquired by each of the spectral signal acquisition channels and perform an imaging and superposed output for each spectral signal.

In an embodiment, the independent-channel acquisition module includes multiple paralleled optical elements, each of which includes a spectroscope or a filter and corresponds to one independent spectral signal acquisition channel.

In an embodiment, the multimodal signal includes a harmonic signal of the laser pulse and fluorescence signals generated by flavin adenine dinucleotide (FAD) molecules and nicotinamide adenine dinucleotide (NADH) molecules. Correspondingly, the spectral signal acquisition channels include a harmonic signal acquisition channel, a FAD signal acquisition channel, and a NADH signal acquisition channel.

In an embodiment, the spectral signal processing device is further configured to deconvolute and separate a spectral signal acquired by the FAD signal acquisition channel, that is, to separate a FAD fluorescence signal intensity from an NADH fluorescence signal intensity, and remove the interference of the NADH fluorescence signal from the FAD fluorescence signal to obtain a pure FAD fluorescence signal.

In an embodiment, the spectral signal processing device deconvolutes and separates the spectral signal by:

$$T_{FAD} = H_{FAD} - a \times H_{NADH}$$

where $T_{FED}$ denotes the pure FAD fluorescence signal acquired by the FAD signal acquisition channel, $H_{FAD}$ denotes the total signal acquired by the FAD signal acquisition channel, a denotes a set coefficient, and $H_{NADH}$ denotes the total signal acquired by the NADH signal acquisition channel.

The multimodal signal acquisition method is configured to acquire a multimodal signal generated by a laser pulse that irradiates a sample, and includes the following steps:
acquiring, by multiple independent spectral signal acquisition channels, the multimodal signal;
filtering spectral signals of specific spectral ranges from the multimodal signal, where each of the spectral signal acquisition channels corresponds to a spectral signal of a specific spectral range in the multimodal signal;
acquiring, by each of the spectral signal acquisition channels, the spectral signals; and performing an imaging and superposed output for each of the spectral signals.

In an embodiment, before irradiating the sample with the laser pulse, the method further includes:
irradiating the sample with the laser pulse with different spectral ranges, such that the laser pulse interacts with the sample to generate the multimodal signal with non-overlapping spectral ranges.

In an embodiment, the multimodal signal acquisition method further includes:
performing spectral adjustment on the laser pulse and adjusting the spectral range of the spectral signal of the laser pulse, such that the range of harmonic signal generated by the interaction of laser pulse with the sample does not overlap with the spectral region of the fluorescent molecule of the sample.

The laser image system includes a laser source, a spectral adjustment module, and a multimodal signal acquisition device.

The laser source is configured to generate a laser pulse.

The spectral adjustment module is configured to adjust the spectral region of the laser pulse to obtain a laser pulse with multiple spectral ranges and allow the laser pulse to irradiate a sample to generate a multimodal signal with non-overlapping spectral ranges.

The multimodal signal acquisition device is configured to acquire the multimodal signal through multiple independent spectral signal acquisition channels and filter spectral signals of specific spectral ranges for imaging.

The multimodal signal acquisition device is further configured to acquire the multimodal signal generated by the laser pulse irradiating the sample and includes an independent-channel acquisition module and a spectral signal processing device that are connected to each other.

The independent-channel acquisition module is provided with multiple independent spectral signal acquisition channels, each of which corresponds to a spectral signal of a specific spectral range in the multimodal signal.

After the laser pulse of a specific spectral range irradiates the sample to generate the multimodal signal, each of the spectral signal acquisition channels acquires the multimodal signal, filters the corresponding spectral signal of the specific spectral range from the multimodal signal, and sends the spectral signal to the spectral signal processing device.

The spectral signal processing device is configured to receive the spectral signals acquired by each of the spectral signal acquisition channels and perform an imaging and superposed output for each spectral signal.

In an embodiment, the spectral adjustment module is further configured to separate the spectral signals of specific spectral ranges from the laser pulse and adjust the spectral ranges of the spectral signals, such that the laser pulse generates the multimodal signal with non-overlapping spectral ranges after interacting with the sample.

In the abovementioned technical solutions of the multimodal signal acquisition device and method and laser image system, the laser source is configured to irradiate the sample with the laser pulse of a specific spectral range to generate the multimodal signal with different spectral ranges. The multimodal signal is acquired through the independent spectral channels, and the spectral signals of different modals are acquired simultaneously and separated effectively. This avoids the calibration deviation and makes the molecular or structural information as indicated by the spectral signal of each modal mutually orthogonal in the image, thereby improving the imaging performance of the laser image system.

In addition, before its use, the laser pulse from laser source goes through spectral adjustment to generate multiple spectral signals of different spectral ranges, ensuring certain spectral ranges that the range of the harmonic signal generated by the interaction of laser pulse with the sample does not overlap with the spectral regions of the fluorescent molecules of the sample. Such a design balances the distribution of spectral signals of the laser pulse and achieves effective separation of the spectral signals of various modals in the presence of fluorescence signals generated from effective and efficient integration of fluorescent molecules.

Furthermore, the FAD and NADH fluorescence signals are acquired through the FAD and NADH signal acquisition channel, respectively; The spectral signal acquired by the FAD signal acquisition channel is deconvoluted and separated in a way that the interference of the NADH fluorescence signal in the FAD fluorescence signal is removed through the simple calculation and pure FAD fluorescence signal is obtained. The design improves signal processing speed and imaging efficiency.

Additional aspects and advantages of the present application will be provided in the following description or become evident in the following description or understood through the practice of the present application.

BRIEF DESCRIPTION OF THE DRAWINGS

The foregoing and/or additional aspects and advantages of the present application will become apparent and readily understood from the following descriptions of the embodiments and references to the drawings.

DETAILED DESCRIPTION OF THE EMBODIMENTS

Figure 1:
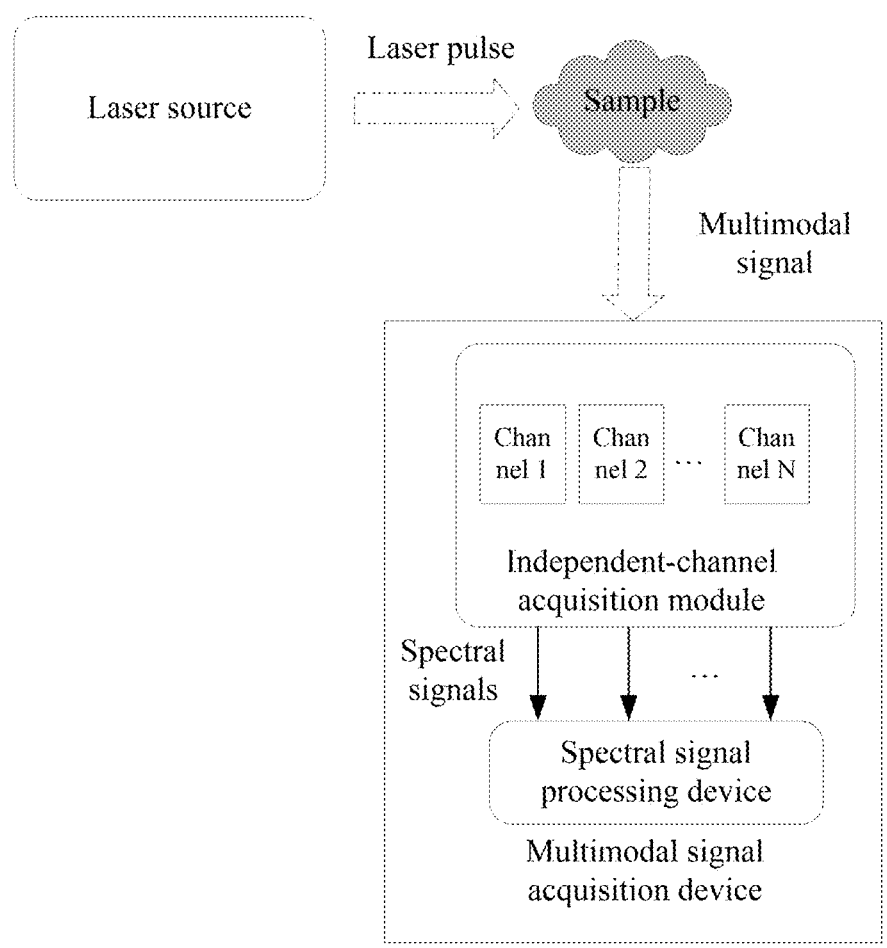
FIG. 1 is a structure diagram of a multimodal signal acquisition device according to an embodiment of the present application.

The embodiments of the present application are described below in detail. The embodiments are shown in the drawings. The same or similar numerals represent the same or similar elements or elements having the same or similar functions throughout the specification. The embodiments described below and references to the drawings are exemplary and are merely intended to explain the present application, rather than to limit the present application.

Those skilled in the art can understand that, unless otherwise stated, the singular forms "a", "an", "said", and "the" used herein may also include plural forms. It should be further understood that the word "comprising" used in the specification of the present disclosure refers to the presence of the described features, integers, steps, operations, elements, and/or components but does not exclude the presence or addition of one or more other features, integers, steps, operations, elements, components, and/or a combination thereof.

FIG. 1 is a structure diagram of a multimodal signal acquisition device according to the present application. Referring to FIG. 1, the multimodal signal acquisition device, which is configured to acquire a multimodal signal generated by a laser pulse that irradiates a sample-such as the scenario when femtosecond laser pulse is used to detect a sample, mainly includes an independent-channel acquisition module and a spectral signal processing device that are connected to each other. As shown in FIG. 1, for acquisition purposes, a laser source generates a femtosecond laser pulse which is transmitted by the corresponding optical element to irradiate a sample on a sample platform. The femtosecond laser pulse interacts with the molecules of the sample to generate a multimodal signal with non-overlapping or partially overlapping spectral ranges. In general, the multimodal signal includes harmonic signals and fluorescence signals of specific molecules. The harmonic signals includes a second harmonic, a third harmonic, and a higher than fourth harmonic signal, whose spectral ranges do not overlap. However, the fluorescence signals of specific molecules may partially overlap due to associated molecular characteristics.

The multimodal signal is acquired through the independent-channel acquisition module. The independent-channel acquisition module is provided with multiple independent spectral signal acquisition channels, for instance, channel 1 to channel N, N≥2, as shown in FIG. 1. Each spectral signal acquisition channel corresponds to a spectral signal of a specific spectral range in the multimodal signal.

In a working process, the laser source generates the laser pulse with multiple specific spectral ranges to irradiate the sample. The laser pulse interacts with the sample to generate the multimodal signal with different spectral ranges. Each spectral signal acquisition channel acquires the multimodal signal, filters a spectral signal of a specific spectral range from the multimodal signal, and sends the spectral signal to the spectral signal processing device. The spectral signal processing device receives the spectral signal acquired by each spectral signal acquisition channel and performs an imaging and superposed output for each spectral signal.

In the solution of the abovementioned embodiments, the laser source is configured to irradiate the sample with the laser pulse of a specific spectral range to generate the multimodal signal with different spectral ranges. The multimodal signal is acquired through the independent spectral channels, and the spectral signals of different modals are acquired simultaneously and separated effectively. This makes the molecular or structural information as indicated by the spectral signal of each modal mutually orthogonal in the image, thereby improving the imaging performance of the laser image system.

More embodiments of the technical solution of the present application are described below with reference to the drawings.

Figure 2:
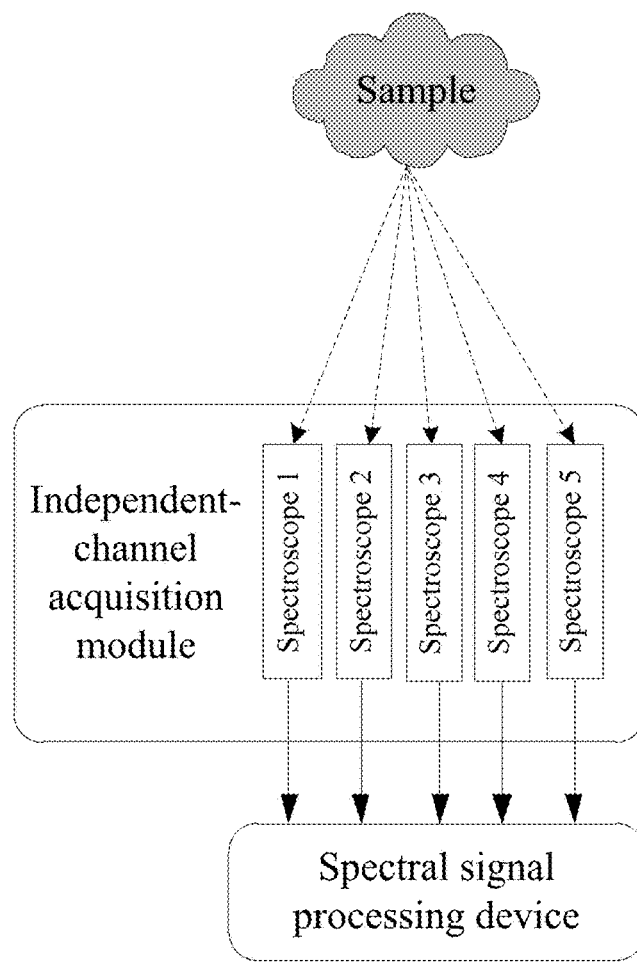
FIG. 2 is a structural diagram of an independent-channel acquisition module according to an embodiment of the present application.

FIG. 2 is a structure diagram of the independent-channel acquisition module. In an embodiment, referring to FIG. 2, the independent-channel acquisition module includes multiple paralleled optical elements, each of which includes a spectroscope or a filter and corresponds to one independent spectral signal acquisition channel.

Specifically, each independent channel is provided with one optical element, such as a spectroscope or filter, to process the spectral signal. Each optical element filters the spectral signal of a specific spectral range and removes the spectral signal of other spectral range. As shown in FIG. 2, there are five paralleled spectroscopes 1 to 5, which correspond to five acquisition channels to independently acquire the spectral signals of five non-overlapping spectral ranges.

In an embodiment, the present application further designs an acquisition solution for flavin adenine dinucleotide (FAD) and nicotinamide adenine dinucleotide (NADH) signals. FAD and NADH molecules are usually acquired by different optical processes, for example, the FAD and NADH molecules are excited by two-photon and three-photon fluorescence physical processes respectively before they are acquired. The present application adopts the same physical process to avoid intermediate deviation and variables. On this basis, the spectral signals can be deconvoluted and separated according to a signal proportional relationship to separate the spectral signal intensities of FAD and NADH by an algorithm.

Specifically, the spectral range of nonlinear spectral signal is partially associated with the characteristics of the molecule itself, for example, the spectral range of the fluorescence emitted by the fluorescent molecules is related to their molecular formulae and structures. The spectral range of nonlinear spectral signal is also partially related to the spectral range of the laser source the generated such spectral signal, for instance, the spectral range of harmonic signal is several times of that of the laser pulse.

As described above, the multimodal signal of the present application can be described as follows:

In this embodiment, the multimodal signal may include a harmonic signal of the laser pulse and fluorescence signals generated by FAD NADH molecules. Correspondingly, the spectral signal acquisition channels include a harmonic (second harmonic, third harmonic, and even fourth or higher harmonic) signal acquisition channel, a FAD signal acquisition channel, and an NADH signal acquisition channel. The non-overlapping harmonic signals are acquired through the independent channels, and the partially overlapping FAD and NADH fluorescence signals are acquired by other means.

Specifically, coenzyme molecules, which are directly associated with cell energy metabolism, may have significant clinical significance. In the actual acquisition solution, the independent acquisition channels can avoid the interactions between the spectral signals of any independent acquisition channels. Due to their molecular characteristics, the fluorescence spectra of the FAD molecules and the NADH molecules partially overlap; however, the specific ranges for acquisition spectral ranges of the FAD signal and the NADH signal are known, and there exists a functional relationship in such known spectral ranges of their fluorescence signals. Therefore, the spectral signals acquired by the acquisition channels corresponding to the FAD molecules and the NADH molecules can be separated to avoid mutual interference.

Based on the studies on the distribution of the FAD fluorescence signal and the NADH fluorescence signal, there is no FAD fluorescence signal observed in the NADH acquisition channel, yet the NADH fluorescence signal can be observed in the FAD acquisition channel. Therefore, it is necessary to separate the spectral signal acquired by the FAD acquisition channel to exclude the interference of the NADH fluorescence signal from the FAD fluorescence signal.

Based on this, the spectral signal processing device is further configured to deconvolute and separate the spectral signal acquired by the FAD signal acquisition channel by an specific algorithm, that is, to separate a FAD fluorescence signal intensity from an NADH fluorescence signal intensity, and remove the interference of the NADH fluorescence signal from the FAD fluorescence signal to obtain a pure FAD fluorescence signal.

Specifically, the spectral signal processing device deconvolutes and separates the spectral signal by:

$$T_{FAD} = H_{FAD} - a \times H_{NADH}$$

where $T_{FAD}$ denotes the pure FAD fluorescence signal acquired by the FAD signal acquisition channel, $H_{FAD}$ denotes the total signal acquired by the FAD signal acquisition channel, a denotes a set coefficient, and $H_{NADH}$ denotes the total signal acquired by the NADH signal acquisition channel.

By adjusting the spectral signals of different spectral ranges of the laser pulse, the interaction of the spectral signals acquired by different acquisition channels can be avoided. However, because the fluorescence spectrum is determined by the characteristics of the molecule itself, the fluorescence spectra of FAD and NADH still partially overlap.

There is no FAD fluorescence signal in the spectral region of the NADH acquisition channel, but there is interference of the NADH fluorescence signal in the spectral region of the FAD acquisition channel. In the technical solution of the present application, the spectral signal acquired by the FAD acquisition channel is deconvoluted and separated to obtain the respective spectral signal intensities of the FAD and the NADH by a specific algorithm.

There is a proportional relationship between the NADH signals acquired by the NADH acquisition channel and the FAD acquisition channel. By adjusting the spectral ranges of spectral signals, under the conditions that the FAD signal and the NADH signal acquired by the FAD acquisition channel are proportional to the n-th (n≥2) power of the laser peak power, it is confirmed that the FAD signal and the NADH signal have additive significance in the sense that the mixed FAD and NADH (fluorescence) signals acquired by the FAD channel can be deconvoluted through the above calculation formula to obtain the pure FAD signal.

An embodiment of a multimodal signal acquisition method of the present application is described below.

Figure 3:
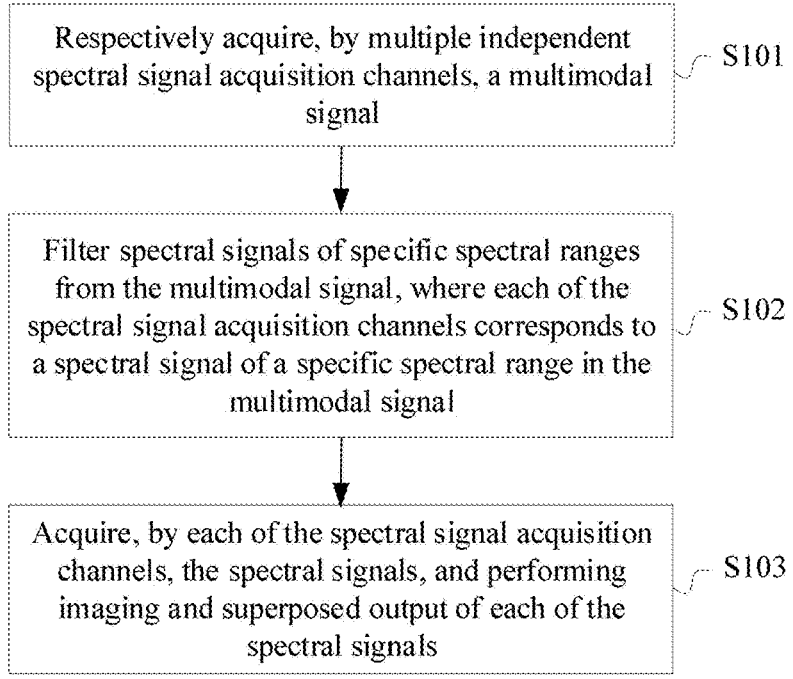
FIG. 3 is a flowchart of a multimodal signal acquisition method according to an embodiment of the present application.

FIG. 3 is a flowchart of a multimodal signal acquisition method according to the present application. Referring to FIG. 3, the multimodal signal acquisition method is configured to acquire a multimodal signal generated by a laser pulse that irradiates a sample and mainly includes the following steps:

S101. The multimodal signal is acquired by multiple independent spectral signal acquisition channels.

S102. Spectral signals of specific spectral ranges are filtered from the multimodal signal, where each of the spectral signal acquisition channels corresponds to a spectral signal of a specific spectral range in the multimodal signal.

S103. The spectral signals are acquired by each of the spectral signal acquisition channels, and an imaging and superposed output for each of the spectral signals are performed.

In the solution of the abovementioned embodiments, the laser source is configured to irradiate the sample with the laser pulse of a specific spectral range to generate the multimodal signal with different non-overlapping or partially overlapping spectral ranges. The multimodal signal is acquired through the independent spectral channels, and the spectral signals of different modals are acquired simultaneously and separated effectively. This avoids the calibration deviation and makes the molecular or structural information as indicated by the spectral signal of each modal mutually orthogonal in the image, thereby improving the imaging performance of the laser image system.

In an embodiment, the laser pulse with different spectral ranges irradiates the sample to generate the multimodal signal. Further, before its use, the laser pulse from laser source goes through spectral adjustment to generate multiple spectral signals of different spectral ranges. In addition, the harmonic signal generated by the laser pulse that interacts with the sample does not overlap the spectral regions of the fluorescent molecules of the sample.

Further, the multimodal signal acquisition method is configured to deconvolute and separate the spectral signal acquired by the FAD signal acquisition channel by a specific algorithm, that is, to separate a FAD fluorescence signal intensity from an NADH fluorescence signal intensity and remove the interference of the NADH fluorescence signal from the FAD fluorescence signal to obtain a pure FAD fluorescence signal.

Specifically, the spectral signal processing device deconvolutes and separates the spectral signal by:

$$T_{FAD}=H_{FAD}-a\times H_{NADH}$$

where $T_{FAD}$ denotes the pure FAD fluorescence signal acquired by the FAD signal acquisition channel, $H_{FAD}$ denotes the total signal acquired by the FAD signal acquisition channel, a denotes a set coefficient, and $H_{NADH}$ denotes the total signal acquired by the NADH signal acquisition channel.

The acquisition solution of the FAD fluorescence signal and the NADH fluorescence signal is consistent with the solution of the aforementioned multimodal signal acquisition device and will not be repeated herein.

An embodiment of a laser image system is described below.

Figure 4:
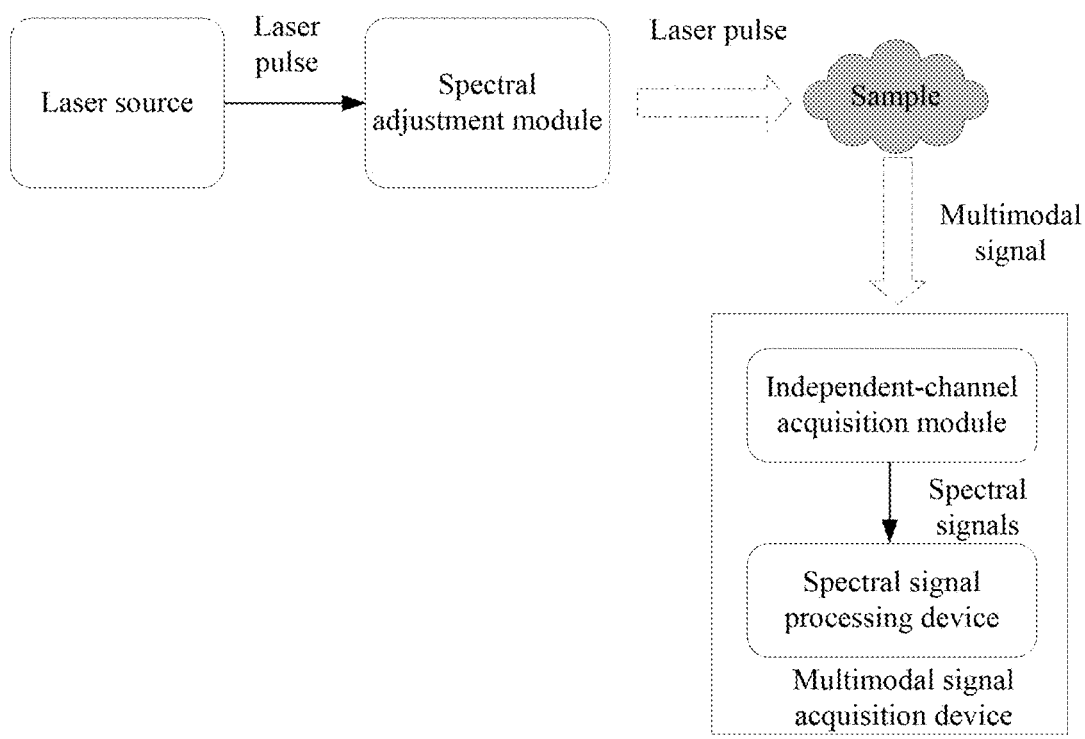
FIG. 4 is a structure diagram of a laser image system according to an embodiment of the present application.

FIG. 4 is a structure diagram of a laser image system according to the present application. Referring to FIG. 4, the laser image system includes a laser source, a spectral adjustment module, and the multimodal signal acquisition device in any one of the above embodiments. The multimodal signal acquisition device mainly includes an independent-channel acquisition module and a spectral signal processing device.

In the laser image system, the laser source is configured to generate a laser pulse. The spectral adjustment module is configured to adjust the spectral region of the laser pulse to obtain a laser pulse with multiple spectral ranges and allow the laser pulse to irradiate a sample to generate a multimodal signal with non-overlapping spectral ranges. The multimodal signal acquisition device is configured to acquire the multimodal signals through multiple independent spectral signal acquisition channels and filter spectral signals of specific spectral ranges for imaging. The independent-channel acquisition module acquires the multimodal signal and filters the corresponding spectral signal of the specific spectral range from the multimodal signal. The spectral signal processing device performs an imaging and superposed output for each spectral signal.

The spectral adjustment module is further configured to separate the spectral signals of specific spectral ranges from the laser pulse and adjust the spectral ranges of the spectral signals, such that the laser pulse generates the multimodal signal with non-overlapping spectral ranges after interacting with the sample. Specifically, the spectral adjustment can be performed by a pulse shaper including a liquid crystal spatial light modulator (SLM), and the spectral range can be selected by controlling the spectral intensity and/or spectral phase of the laser pulse.

In the technical solution of this embodiment, when the multimodal signal is generated by the laser pulse, the spectral adjustment module first performs a spectral adjustment on the laser pulse generated by the laser source to generate the laser pulse with one or more specific spectral ranges. The laser pulse with the specific spectral range is focused on the sample and interacts with the sample to generate the multimodal signal. When the multimodal signal is acquired, the spectral signals of corresponding spectral ranges are acquired through multiple independent spectral signal acquisition channels, such that the spectral signals under different modes are simultaneously acquired and effectively separated. In this way, the molecular or structural information as indicated by spectral signals under each modal is made mutually orthogonal in the image to achieve the desired imaging effect.

In addition, the multimodal signal acquisition device provided by the embodiment of the present application is further configured to deconvolute and separate the spectral signal acquired by the FAD signal acquisition channel by a simple calculation process, that is, to separate a FAD fluorescence signal intensity from an NADH fluorescence signal intensity, and remove the interference of the NADH fluorescence signal from the FAD fluorescence signal to obtain a pure FAD fluorescence signal.

In the laser image system provided by the present application, the multimodal signal includes a second harmonic signal with a spectral region of 570 nm to 630 nm, a third harmonic signal with a spectral region of 343 nm to 405 nm, a fluorescence signal with a spectral region of 510 nm to 565 nm, a fluorescence signal with a spectral region of 410 nm to 490 nm, and a nonlinear Raman signal with a spectral region of 640 nm to 723 nm.

Those skilled in the art should understand that, unless otherwise defined, all terms (including technical terms and scientific terms) used herein have the same meaning as those commonly understood by those of ordinary skill in the art to which the present application belongs. It should also be understood that terms such as those defined in general dictionaries should be understood as having meanings consistent with the meanings in the context of the prior art, and unless otherwise defined herein, these terms will not be explained in ideal or overly-formal meanings.

The foregoing are merely descriptions of the preferred embodiments of the present application. It should be noted that improvements and modifications can be made by those of ordinary skill in the art without departing from the principles of the present application, and these improvements and modifications should also be considered as falling within the protection scope of the present application.

What is claimed is:

1. A multimodal signal acquisition device configured to acquire a multimodal signal generated by a laser pulse that irradiates a sample, comprising an independent-channel acquisition module and a spectral signal processor that are connected to each other, wherein the independent-channel acquisition module is provided with multiple independent spectral signal acquisition channels, each of the spectral signal acquisition channels corresponds to a spectral signal of a specific spectral range in the multimodal signal; the multimodal signal comprises fluorescence signals generated by a flavin adenine dinucleotide (FAD) molecule and a nicotinamide adenine dinucleotide (NADH) molecule; the spectral signal acquisition channels comprise a FAD signal acquisition channel and an NADH signal acquisition channel;

after the laser pulse of a specific spectral range irradiates the sample to generate the multimodal signal, each of the spectral signal acquisition channels acquires the multimodal signal, filters the corresponding spectral signal of the specific spectral range from the multimodal signal, and sends the spectral signal to the spectral signal processor; and the spectral signal processor is configured to receive the spectral signal acquired by each of the spectral signal acquisition channels, deconvolute and separate the spectral signal acquired by the FAD signal acquisition channel, that is, to separate a FAD fluorescence signal intensity from an NADH fluorescence signal intensity and remove an interference of the NADH fluorescence signal from the FAD fluorescence signal to obtain a pure FAD fluorescence signal, and perform an imaging and superposed output of each spectral signal, wherein the spectral signal processor deconvolutes and separates the spectral signal by:

$$T_{FAD}=H_{FAD}-a\times H_{NADH}$$

wherein $T_{FAD}$ denotes the pure FAD fluorescence signal acquired by the FAD signal acquisition channel, $H_{FAD}$ denotes a total signal acquired by the FAD signal acquisition channel, a denotes a set coefficient, and $H_{NADH}$ denotes a total signal acquired by the NADH signal acquisition channel.

2. The multimodal signal acquisition device according to claim 1, wherein the independent-channel acquisition module comprises multiple parallel optical elements, each of the optical elements corresponds to one independent spectral signal acquisition channel; wherein the optical elements comprise a spectroscope or a filter.

3. The multimodal signal acquisition device according to claim 1, wherein the multimodal signal further comprises a harmonic signal of the laser pulse;

the spectral signal acquisition channels further comprise a harmonic signal acquisition channel.

4. A multimodal signal acquisition method configured to acquire a multimodal signal generated by a laser pulse that irradiates a sample, comprising the following steps:

acquiring, by multiple independent spectral signal acquisition channels, the multimodal signal; wherein the multimodal signal comprises fluorescence signals generated by a FAD molecule and a NADH molecule; the spectral signal acquisition channels comprise a FAD signal acquisition channel and an NADH signal acquisition channel;

filtering corresponding spectral signals of specific spectral ranges from the multimodal signal, wherein each of the spectral signal acquisition channels corresponds to a spectral signal of a specific spectral range in the multimodal signal; and acquiring, by each of the spectral signal acquisition channels, the spectral signals, deconvoluting and separating the spectral signal acquired by the FAD signal acquisition channel; to separate a FAD fluorescence signal intensity from an NADH fluorescence signal intensity and removing an interference of the NADH fluorescence signal from the FAD fluorescence signal to obtain a pure FAD fluorescence signal, and performing an imaging and superposed output of each of the spectral signals, wherein the deconvoluting and separating is implemented by applying:

$$T_{FAD}=H_{FAD}-a\times H_{NADH}$$

wherein $T_{FAD}$ denotes the pure FAD fluorescence signal acquired by the FAD signal acquisition channel, $H_{FAD}$ denotes a total signal acquired by the FAD signal acquisition channel, a denotes a set coefficient, and $H_{NADH}$ denotes a total signal acquired by the NADH signal acquisition channel.

5. The multimodal signal acquisition method according to claim 4, wherein before irradiating the sample with the laser pulse, the multimodal signal acquisition method further comprises:

irradiating the sample with the laser pulse with different spectral ranges, such that the laser pulse interacts with the sample to generate the multimodal signal with non-overlapping spectral ranges.

6. The multimodal signal acquisition method according to claim 5, wherein the multimodal signal acquisition method further comprises:

performing a spectral adjustment on the laser pulse and adjusting a spectral range of the spectral signal of the laser pulse, such that a harmonic signal generated by the laser pulse interacting with the sample does not overlap with a spectral region of a fluorescent molecule of the sample.

7. A laser image system, comprising a laser source, a spectral adjustment module, and the multimodal signal acquisition device according to claim 1, wherein the laser source is configured to generate the laser pulse;

the spectral adjustment module is configured to adjust a spectral region of the laser pulse to obtain a laser pulse with multiple spectral ranges and allow the laser pulse to irradiate the sample to generate a multimodal signal with non-overlapping spectral ranges;

the multimodal signal acquisition device is configured to respectively acquire the multimodal signals through the multiple independent spectral signal acquisition channels and filter spectral signals of specific spectral ranges for imaging.

8. The laser image system according to claim 7, wherein the spectral adjustment module is further configured to separate the spectral signals of specific spectral ranges from the laser pulse and adjust the spectral ranges of the spectral signals, such that the laser pulse generates the multimodal signal with non-overlapping spectral ranges after interacting with the sample.

9. The laser image system according to claim 7, wherein in the multimodal signal acquisition device, the independent-channel acquisition module comprises multiple parallel optical elements, each of the optical elements corresponds to one independent spectral signal acquisition channel; wherein the optical elements comprise a spectroscope or a filter.

10. The laser image system according to claim 7, wherein in the multimodal signal acquisition device, the multimodal signal further comprises a harmonic signal of the laser pulse; the spectral signal acquisition channels further comprise a harmonic signal acquisition channel.

\* \* \* \* \*